United States Patent
Kallay et al.

(10) Patent No.: US 8,638,327 B2
(45) Date of Patent: Jan. 28, 2014

(54) TILED PROJECTIONS FOR PLANAR PROCESSING OF ROUND EARTH DATA

(75) Inventors: Michael Kallay, Bellevue, WA (US); Isaac Kenneth Kunen, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 920 days.

(21) Appl. No.: 12/117,572

(22) Filed: May 8, 2008

(65) Prior Publication Data

US 2009/0123088 A1  May 14, 2009

Related U.S. Application Data

(60) Provisional application No. 60/987,873, filed on Nov. 14, 2007.

(51) Int. Cl.
| G06F 17/00 | (2006.01) |
| G06T 1/00 | (2006.01) |
| G06T 15/00 | (2011.01) |
| G06K 9/32 | (2006.01) |

(52) U.S. Cl.
USPC ............ 345/418; 345/419; 382/293; 382/295

(58) Field of Classification Search
USPC .................. 345/418, 419, 423, 582–588; 382/276–308
See application file for complete search history.

(56) References Cited

U.S. PATENT DOCUMENTS

| 2,424,601 A * | 7/1947 | Crouch ........................ 434/135 |
| 2,436,860 A * | 3/1948 | Fisher ......................... 434/135 |
| 5,222,896 A | 6/1993 | Smith, Jr. |
| 5,798,923 A | 8/1998 | Laskowski |
| 5,902,113 A | 5/1999 | Pryor et al. |
| 5,923,331 A | 7/1999 | Dusseux et al. |
| 6,243,488 B1 | 6/2001 | Penna |
| 6,725,174 B2 | 4/2004 | Bouts et al. |
| 7,127,107 B2 | 10/2006 | Kubota et al. |
| 7,292,722 B2 | 11/2007 | Lelescu et al. |
| 7,686,616 B1 * | 3/2010 | Cloud ........................... 434/147 |
| 2002/0126129 A1 * | 9/2002 | Snyder et al. ................ 345/582 |
| 2002/0140702 A1 * | 10/2002 | Koller ........................... 345/582 |
| 2004/0054475 A1 | 3/2004 | Grace et al. |
| 2005/0195214 A1 * | 9/2005 | Reid et al. ..................... 345/611 |
| 2006/0031876 A1 * | 2/2006 | Ok et al. ......................... 725/39 |

(Continued)

OTHER PUBLICATIONS

Sahr et al., "Geodesic Discrete Global Grid System," Cartography and Geographic Information Science, vol. 30, No. 2, 2003, pp. 121-134.

(Continued)

*Primary Examiner* — Ke Xiao
*Assistant Examiner* — Jed-Justin Imperial

(57) ABSTRACT

A system and method that facilitates planar processing of round earth data by employing a tiled projection is provided. The tiled projection is a two-step projection from the surface of the earth to a common plane that preserves polygons and polygonal paths. During the first step, the system performs a gnomonic projection to the facets of a circumscribed platonic solid, which maps spherical polygons to spatial polygons on the facets of the solid. During the second step, the system performs a polygon-preserving projection from the facets of the platonic solid to tiles in common plane. Thus, projections from multiple facets of the platonic solid on the common plane are processed by employing a planar algorithm.

20 Claims, 15 Drawing Sheets

(56) References Cited

U.S. PATENT DOCUMENTS

| | | | |
|---|---|---|---|
| 2006/0241860 A1* | 10/2006 | Kimchi et al. | 701/208 |
| 2006/0251336 A1* | 11/2006 | Lelescu et al. | 382/276 |
| 2007/0003911 A1 | 1/2007 | Serre | |
| 2008/0059205 A1* | 3/2008 | Dayan et al. | 705/1 |
| 2009/0037441 A1* | 2/2009 | Howell et al. | 707/100 |

OTHER PUBLICATIONS

International Search Report and Written Opinion mailed Jul. 10, 2009 for PCT Application Serial No. PCT/US2008/083228, 10 pages.

Jacopo Grazzini, et al. Edge-Preserving Smoothing of High-Resolution Images with a Partial Multifractal Reconstruction Scheme http://www.iacm.forth.gr/regional/papers/grazzini_smooth_isprs04.pdf. Last accessed Nov. 16, 2007, 5 pages.

Robert Gibson. Using a Geodesic Spatial Index to Improve Map Server Performance. Proceedings of the Earth Observation & Geo-Spatial Web and Internet Workshop '98 = Salzburger Geographische Materialien, vol. 27. Instituts für Geographie der Universität Salzburg. ISBN: 3-85283-014-1 http://www.sbg.ac.at/geo/eogeo/authors/gibson/gibson.html. Last accessed Nov. 16, 2007, 14 pages.

Laurent M. Mugnier, et al. MISTRAL: A Myopic Edge-Preserving Image Restoration Method, With Application to Astronomical Adaptive-Optics-Corrected Long-Exposure Images. vol. 21, No. 10/Oct. 2004/ J. Optical Society of America, 1084-7529/2004/101841-14. http://laurent.mugnier.free.fr/publis/Mugnier-JOSAA-04.pdf. Last accessed Nov. 16, 2007, 14 pages.

Proposed NGS Geodetic Tool Kit Additions—Low Distortion Projection Tools . Draft: Aug. 1, 2006. http://www.calmit.unl.edu/gis/LDP%20Concept%20Paper.pdf. Last accessed Nov. 16, 2007, 3 pages.

* cited by examiner

TILED PROJECTIONS FOR PLANAR PROCESSING OF ROUND EARTH DATA

CROSS-REFERENCE TO RELATED APPLICATIONS

This application is a continuation of U.S. Patent Application Ser. No. 60/987,873, filed on Nov. 14, 2007, entitled "TILED PROJECTIONS FOR PLANAR PROCESSING OF ROUND EARTH DATA." The entireties of which are incorporated herein by reference.

BACKGROUND

Geographic data can be represented as points, polygons and polygonal paths. When processing such data it is often required to execute queries e.g. "Do these polygons intersect?" or construct new data e.g. the intersection of two polygons. For efficient execution of queries in databases (e.g. "Select all the entries that intersect this polygon"), a spatial index, for example, that is based on a rectangular grid can be employed to avoid fetching entries that are irrelevant. For processing round earth data, it is highly desirable to fit the entire globe with a rectangular grid in a way that minimizes distortions.

Geographic data come in two flavors: planar coordinates in a specific map, and latitude-longitude coordinates on a round earth. The algorithms for queries and constructions are very elaborate and complex. It is therefore highly desirable to utilize the same implementation of algorithms for planar and round earth computations. Typically, geographic data is projected onto a plane and then processed. The projection can be edge-preserving, such that, it can map round-earth polygon edges to linear segments in the plane. Non-numerical planar geometric algorithms can be applied to (round earth) geographical objects after they have been projected to a plane. The type of projection can vary, depending on the type of operation and the extents of the operands.

Unfortunately, a single projection cannot map the entire globe to a plane. Moreover, the extents of the scene that may be mapped to a plane with any single projection are limited by distortion at the fringes. Conventional systems partition a scene into a plurality of patches to minimize distortion, and project each patch to a different plane. The computation can be performed piecemeal in each plane, and additional steps are taken to resolve the results at the seams between patches. The piecemeal processing can lead to significant overhead. Furthermore, to minimize distortions the number of patches may have to be increased, which can lead to increased complexity of stitching together seams of the different patches.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The systems and methods disclosed herein, in one aspect thereof, can facilitate tiled projections for mapping round earth data to a common plane, such that, planar algorithms can be applied to perform computations on round earth data. The tiled projection can include mapping surface data to facets of a polyhedron, such as, but not limited to, an octahedron, a tetrahedron or a cube. Further, the facets of the polyhedron can be mapped to a single common plane to facilitate planar processing.

In accordance with another aspect of the system, a mapping component can facilitate a two-step projection from a sphere to a common plane that preserves polygons and polygonal paths. The mapping component can include a first projection component that can perform a gnomonic projection of the surface data to the facets of a circumscribed platonic solid (e.g. octahedron, a tetrahedron or a cube), which can map spherical polygons to spatial polygons on the facets of the solid. The mapping component can further include a second projection component that can perform polygon-preserving projection from facets of the platonic solid to the common plane. In an aspect, a processing component can perform planar operations on the projections in the common plane utilizing planar algorithms.

According to another aspect of the subject specification, the second projection component can include a crease vertex addition component and a node vertex addition component that can add fake crease and node vertices to a projection in the plane that crosses over two or more tiles, or two or more planes, respectively. The fake crease vertices preserve polygons and polygonal paths while the fake node vertices help assemble the results of two planar constructions along the seams.

Another aspect of the subject innovation comprises an inverse mapping component that can map results of the planar processing back to round earth surface by mapping a point from a tile on the common plane to a point on a facet of a polyhedron during a first step and mapping the point from the facet of polyhedron to the round earth surface during a second step. Further, a display component can be employed to display the results to a user.

Yet another aspect of the disclosed subject matter relates to a method that can facilitate planar processing of round earth data by employing tiled projections in accordance with an aspect of the subject innovation. In one aspect, the methodology can input surface data of a sphere (or ellipsoid, or planet) and map the surface data to corresponding facets of a polyhedron circumscribing the sphere. Further, multiple facets of the polyhedron can be mapped to corresponding tiles on a single common plane. Fake crease vertices can be added to projections that cross over two or more tiles and fake node vertices can be added to projections that cross over two planes, such that, polygons and polygonal paths can be preserved. The data mapped to the plane can be processed by employing planar algorithms. In an aspect, the result of the processing in the plane can be mapped back to the surface of the sphere and displayed to a user.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
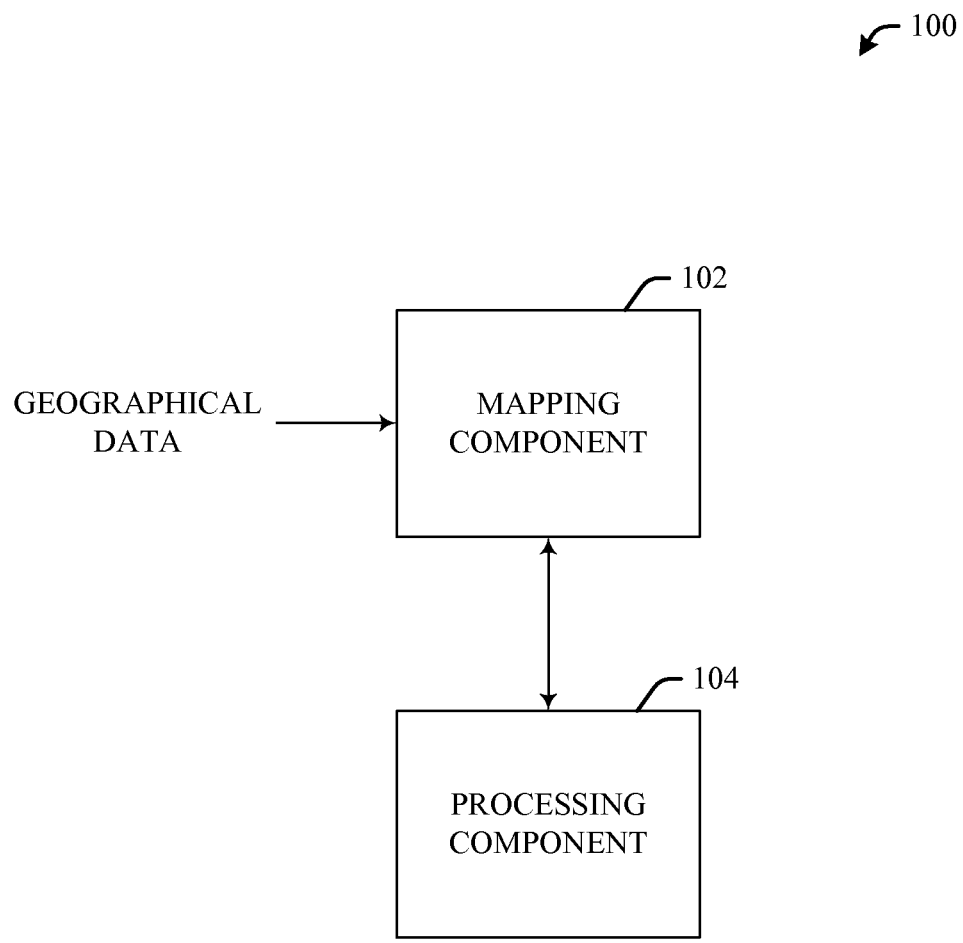
FIG. 1 illustrates an example system that can facilitate tiled projections for planar processing of geographic data in accordance with an aspect of the disclosed subject matter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Traditional systems employ a basic edge-preserving projection, such as, a gnomonic projection, which maps a point on a sphere (round earth) to a tangent plane by extending the radius vector at the point and intersecting it with the plane. The distortion of this projection can increase as the projected point gets further away from the tangency point and the mapping can become undefined when the radius vector is parallel to the plane. Thus, multiple patches can be employed to minimize distortion of the projection. Typically, each patch can be projected to a disparate plane and computations can be performed in each plane by employing planar algorithms. Further, additional steps can be taken to resolve the results at the seams between patches to achieve an accurate overall result.

Systems and methods are provided that employ a low-distortion tiled projection to map an entire hemisphere to a single plane. Since most real-world computations are applied to data that fits in a hemisphere, constructions and queries can thus be performed within a single planar projection. Even when the data exceeds a hemisphere, the entire globe can be handled by two projections, and the seam between them is simple, since it is equator single great circle. Additionally, the image of this projection can be naturally covered by a rectangular grid. Combining the grids on the images of the two hemispheres provides a low-distortion spatial index for the entire globe. However, the specification is not limited to grid schemes but covers the extension to the sphere of all forms of spatial indexing in the plane. It can be appreciated that although the specification discloses tiled projection techniques for round earth data, data from most any planet, spheroid, or ellipsoid and/or celestial data can be employed. As an example, a sky can be represented as a celestial sphere such that celestial data can include information regarding most any celestial body in the sky. It can be appreciated that the terms "round earth", "spheroid", "sphere", "ellipsoid" and "planet" are generally used interchangeably herein.

Referring initially to FIG. 1, illustrated is an example system 100 that can facilitate tiled projections for planar processing of geographic data in accordance with an aspect of the disclosed subject matter. The system 100 can employ a low-distortion projection that maps a hemisphere to a single plane. Typically, the system 100 can include a mapping component 102 that projects geographical data from round earth onto a single two-dimensional plane by employing tiled projection. It can be appreciated that geographical data is not limited to round earth data and data associated with the surface of most any celestial body, spheroid or ellipsoid, can be employed by the mapping component 102.

According to an aspect, the mapping component 102 can employ a two-step mapping to project the round surface data to a single plane. During a first step, the mapping component 102 can utilize a piecewise gnomonic projection from patches of the round earth to the facets of most any polyhedron that circumscribes the round earth. During a second step, the mapping component 102 can employ a line-preserving mapping from a subset of the facets of the polyhedron to a common plane. Typically, the images of the facets of the polyhedron in the planar projection can be called tiles, while the images of the polyhedral edges that separate them can be called creases. Further, the images of the polyhedral edges that map to the boundary of the projected image can be called seams.

In accordance with an aspect, the mapping component 102 can be employed to map great circle arcs on a sphere to straight lines in a plane. Further, the tiled projection employed by the mapping component 102, introduces fake vertices that can accurately represent an edge on a plane that crosses over two or more tiles and can preserve polygonal properties. As an example, a line that is projected onto the facets of the polyhedron, which is contained in a single tile can appear as a straight line in the plane while, a line that is contained in two or more tiles can appear as a broken (bent) line in the plane.

The mapping component 102 can map an edge on the round earth to a straight line segment in the common plane if its image is contained in a single tile. However, when an edge spans two or more tiles, its images in those tiles are not necessarily collinear. The mapping component 102 can insert a fake crease vertex on an edge at a crease that separates the edge onto two tiles. Crease vertices can be ignored when they are returned from planar constructions. Similarly, the mapping component 102 can add a node vertex when an edge crosses a seam from one hemisphere to the other. Node vertices can be tracked when construction results on the two hemispheres are processed along the seam.

In accordance with an aspect, the system 100 can further include a processing component 104 that can perform operations on the common plane. According to an aspect, the processing component 104 can employ planar algorithms to perform operations on multiple facets projected as tiles in the common plane. The operations can include, but are not limited to set queries and/or set constructions. Set constructions can be performed on two or more sets (geographic regions) and can include operations such as, but not limited to, union, intersection, difference, and/or symmetric difference of two or more sets. The processing component 104 can employ most any plane partitioning and/or spatial indexing scheme, such as, but not limited to, grid, quad tree, R-tree and/or kd-tree.

The processing component 104 can also compute query results on the planar data. As an example, queries such as, "Does region A contain region B?", "Does region A touch region B?" and/or "Does path A intersect path B?" can be calculated. Further, the processing component 104 can compute a query to determine if a given geometry is valid or not. For example, a polygon cannot intersect itself and would lead to an invalid result. Furthermore, processing component 104 can employ planar algorithms to construct new data such as, but not limited to, constructing a region with a given radius from a given input point on the round earth that has been projected onto the common plane. Additionally, the processing component 104 can perform queries on a sky that is represented as a celestial sphere. As an example, queries such as "Get all the stars within a given polygon" or "Determine the region with a given radius from a star".

In accordance with an embodiment, the processing component 104 can perform operations, such as, but not limited to, the aforementioned set queries and/or constructions on a single common plane that maps round earth data. Further, the processing component 104 can combine results between planes representing each hemisphere, if required, by tracking node vertices associated with the results.

For efficient execution of queries in databases, a spatial index can be employed to avoid fetching irrelevant entries. As an example, the spatial index can be based on a rectangular grid. The mapping component 102 can map the entire globe within a rectangular grid, in a way that minimizes distortions, to facilitate processing of round earth data. However, it can be appreciated that the specification is not limited to spatial indexing with grid schemes but can employ most any form of spatial indexing in the plane (e.g. grid, quad tree, R-tree and/or kd-tree).

Figure 2:
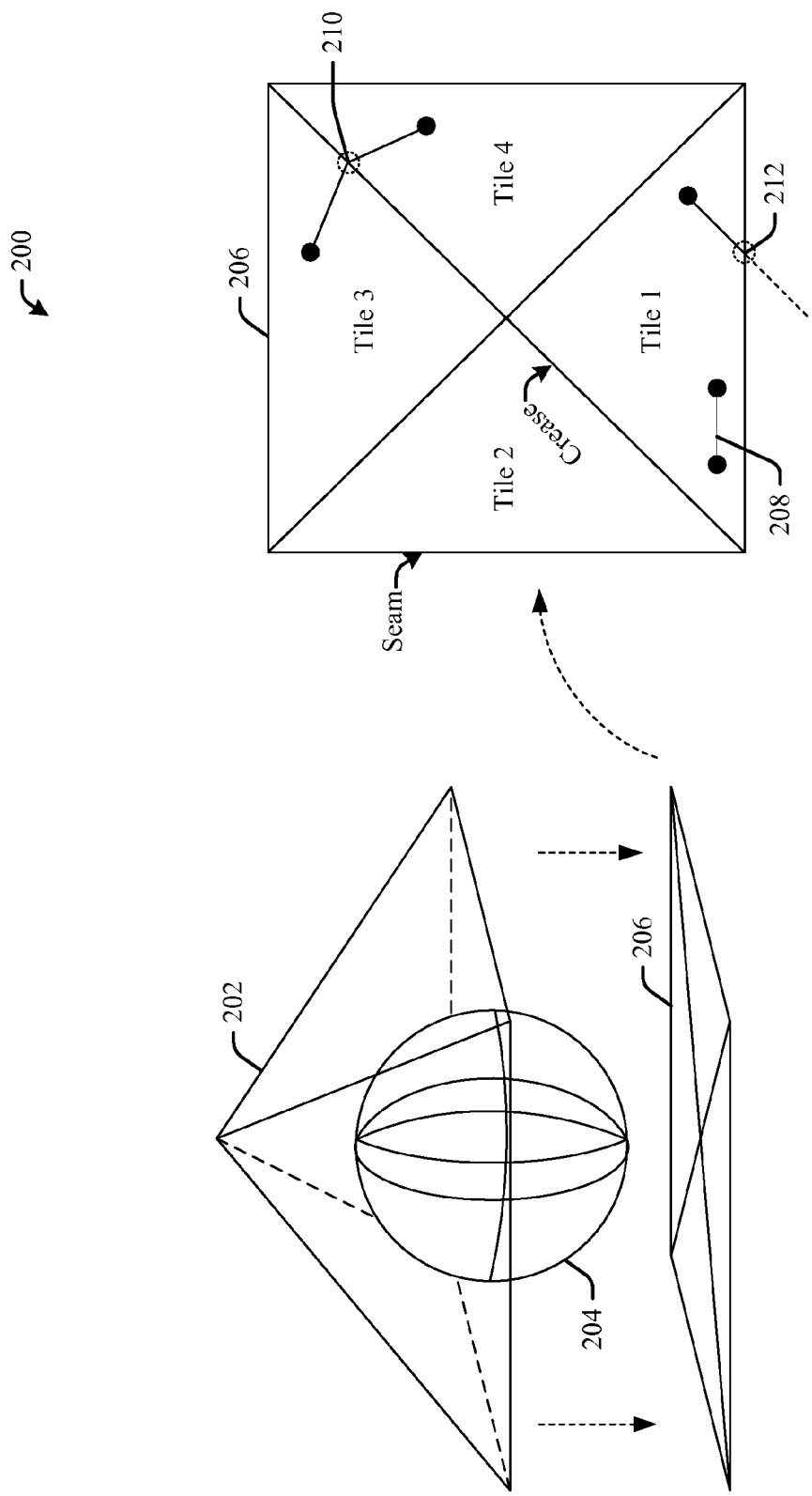
FIG. 2 illustrates an example embodiment that depicts a tiled projection for planar processing of geographic data by employing a regular octahedron in accordance with an aspect of the disclosed subject matter.

Referring now to FIG. 2, illustrated is an example embodiment 200 that depicts tiled projections for planar processing of geographic data by employing a regular octahedron 202 in accordance with an aspect of the disclosed subject matter. The octahedron 202 circumscribes the round earth 204, such that four octants of a hemisphere can be mapped to four facets of the octahedron 202, as shown. Specifically, a local coordinate system can be used in which the octahedron 202 can have one vertex on the z axis and four vertices as an axis aligned square in the x,y plane. According to an aspect, a Cartesian coordinate system can be employed, wherein, the z axis runs through the center of the scene, such that a regular octahedron 202 can be circumscribed about the round earth 204 in a way that two of its vertices lie on the z axis.

According to an embodiment, a gnomonic projection can be employed to project the octants onto the facets of the circumscribed octahedron 202, such that, spherical polygons on the round earth 204 can be mapped to spatial polygons on the facets of the octahedron 202. It can be appreciated that the tiled projection and mapping described herein is not limited to round earth data but can be applied to surface data from most any celestial body, spheroid and/or ellipsoid.

The four facets of the octahedron can further be mapped onto a single common plane 206. Typically, an affine projection along the z axis into the x,y plane of the equator can be employed to map the facets; however, it can be appreciated that most any technique for projection can be applied for the mapping. In one aspect, each facet of the octahedron 202 can be mapped to a corresponding tile (Tile 1-Tile 4) in the plane 206. Thus, the image of each hemisphere of the round earth 204 under the combined mapping is a square divided into four tiles (Tile 1-Tile 4), which are the images of the facets of the octahedron 202. It can be appreciated that although the mapping for one hemisphere is depicted in the figure, a similar mapping can be employed to the other hemisphere of the round earth 204.

In one aspect, the line between two adjacent tiles is a crease and the line between two planes associated with each hemisphere is a seam, as shown in FIG. 2. Both the gnomonic and affine mappings, described supra, preserve straight line segments, such that, the image 208 of an edge is linear when the projection is contained in a single tile. However, if the projection crosses between tiles, the image of an edge can be broken into its linear pieces by inserting fake crease vertices 210 at the corresponding creases. Thus, the image of a polygon or a polygonal path can be completely defined by the sequence of original and fake vertices, and the problem can be reduced to the equivalent planar one on the tiled square 206. For construction algorithms, the fake vertices can be ignored when the result is converted back to geodetic coordinates.

According to an aspect, the round earth 204 can be continuously processed in its entirety with two tiled projections from two hemispheres. Typically, polygons and polygonal paths that straddle the seam between the two planes can be clipped or trimmed using fake node vertices 212 and fake edges along the seam. Geometric constructions assemble the results of the two planar constructions along the seams.

As an example, any point (not shown) on round earth 204 can be represented as a point on plane 206 by employing the tiled projection described above. The point can first be projected onto a corresponding facet of octahedron 202 by employing a gnomonic projection (e.g. by the mapping component 102 in FIG. 1). Secondly, the point on the facet of octahedron 202 can be projected onto a common plane 206 by employing an affine projection (e.g. by the mapping component 102 in FIG. 1). As another example, a great circle arc or an edge (not shown) on the round earth 204 can be represented as a straight line on plane 206. Specifically, the great circle arc can be mapped to a straight line on the facets of the octahedron 202 by a gnomonic projection and then projected onto the common plane 206 by employing an affine projection (e.g. by the mapping component 102 in FIG. 1). The image of a great circle arc or edge under projection to a facet is a straight line segment 208, but when the great circle arc (or edge) crosses one or more creases, its pieces are in general not collinear. According to an aspect, in the case when the great circle arc crosses over one or more crease, a fake crease vertex 210 can be inserted at the intersection of the crease and the segment (e.g. by the mapping component 102 in FIG. 1). Similarly, a fake node vertex 212 can be inserted when a great circle arc (or edge) crosses a seam from one hemisphere to another (e.g. by the mapping component 102 in FIG. 1). Thus, great circle arcs (or edges) that cross one or more creases and/or seams can be represented as broken (bent) straight lines on the plane 206, such that polygons and polygonal paths can be preserved during the mapping.

Figure 3:
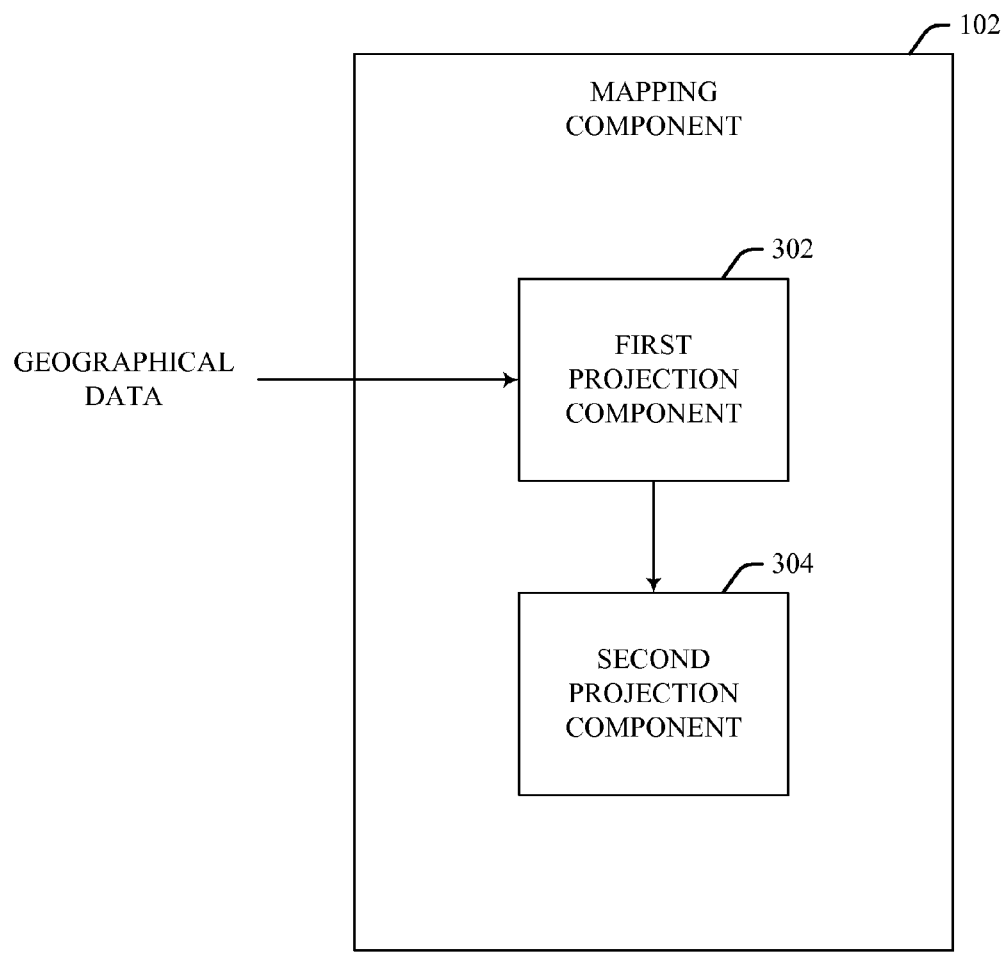
FIG. 3 illustrates an example system that can facilitate tiled projections of each hemisphere of a planet to a single common plane, according to an aspect of the disclosed subject innovation.

FIG. 3 illustrates an example mapping component 102 that can facilitate tiled projections of each hemisphere of a planet to a single common plane, according to an aspect of the disclosed subject innovation. The mapping component 102 projects geographical data from a celestial body, such as, but not limited to, round earth, onto not more than two planes. The geographic data can include surface data of most any spheroid or ellipsoid (e.g. a celestial sphere).

In accordance with an aspect, the mapping component 102 can include a first projection component 302 that can facilitate a mapping from the round planet surface to a facet of a polyhedron. It can be appreciated that the polyhedron can include, but is not limited to, an octahedron, a tetrahedron or a cube, that circumscribes the planet. The first projection component 302 can map spherical polygons on the surface of the planet, to spatial polygons on the facets of the polyhedron. Further, the projection performed by the first projection component 302 can preserve straight line segments, such that, the image of an edge is linear when it is contained in a single facet.

As an example, the first projection component 302 projects a point from a specific latitude and longitude on the round planet surface onto a facet of the polyhedron. In particular, the first projection component 302 can compute a point on the surface of the planet and calculate its coordinates in the polyhedron's local coordinate system. Further, the first projection component 302 can determine a facet of the polyhedron to which the point can be projected based in part on the signs the equations of the planes through the creases.

According to an aspect, a second projection component 304 can be employed to provide a line-preserving mapping from a subset of the facets of the polyhedron to a common plane. The second projection component 304 can map a facet of the polyhedron to a corresponding tile in the common plane. In an aspect, the second projection component 304 can image an entire hemisphere onto a single plane by employing a projection along the z axis into the x,y plane of the equator. However, it can be appreciated that most any technique for projection can be applied for the mapping. Thus, the image of each hemisphere of the round earth 204 under the combined mapping is a square divided into four tiles, which are the images of facets of the octahedron 202. In one embodiment, the second projection component 304 can determine a tile on the common plane to which a point on a facet can be projected based on the coordinates of the point on the facet. As an example, the z coordinate of the point can be dropped to obtain the projection of the point on the x,y plane.

According to another aspect, the second projection component 304 can introduce fake vertices during the mapping. As an example, if a segment on the polyhedron crosses over one or more facets of the polyhedron, the second projection component 304 can insert a fake crease vertex at each point where the segment crosses from one facet to the next. Thus, an edge on the surface of the planet that is contained in one or more facets is mapped to a single common plane as a broken (bent) straight line by insertion of a fake crease vertex. Similarly, the second projection component 304 can insert a fake node vertex at a point where an edge crosses a seam.

Figure 4:
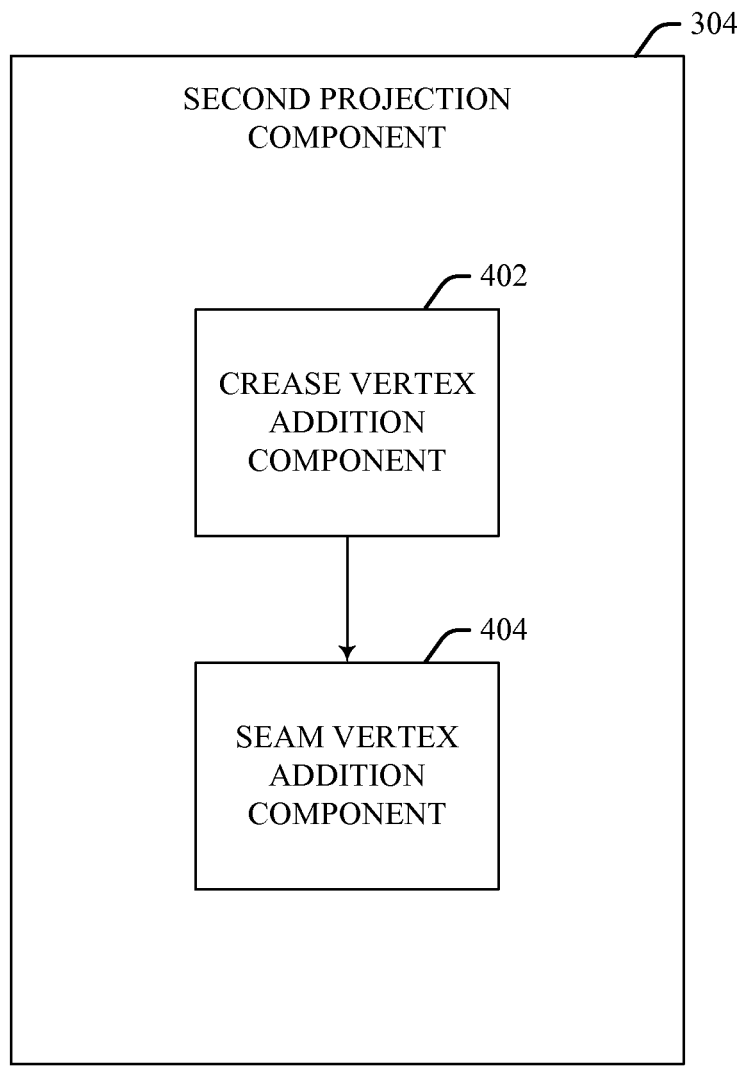
FIG. 4 illustrates an example system that can facilitate mapping of half of a sphere to a plane of its equator, according to an aspect of the subject innovation.

Referring now to FIG. 4, there illustrated is an example second projection component 304 that can facilitate mapping of half of a sphere to a plane of its equator, according to an aspect of the subject innovation. It can be appreciated that the second projection component 304 can include mapping of most any celestial body such as, but not limited to, the earth or most any planet or ellipsoid or sphere (e.g. celestial sphere).

As described supra (with respect to FIG. 3), the second projection component 304 can be employed to project one or more points from facets of a polyhedron onto a common plane. Typically, the second projection component 304 can include a crease vertex addition component 402 and a node vertex addition component 404, as depicted in FIG. 4. In one aspect, the crease vertex addition component 402 can be employed to insert a fake crease vertex on the projection of an edge on common plane that crosses between two tiles. Similarly, the node vertex addition component 404 can be employed to insert a fake node vertex on the projection of an edge on common plane that crosses between two seams.

According to an aspect, the crease vertex addition component 402 can compute fake crease vertex coordinates for an edge that crosses over two tiles. When the endpoints of an edge lie in different facets of a polyhedron, the line segment between their projections is not the projection of the edge. A fake crease vertex can therefore be inserted between them by the crease vertex addition component 402 at the projection of the point on the sphere where the edge crosses the line between facets. As an example, for an edge on the sphere with endpoints A,B, crease vertex addition component 402 can calculate the fake crease vertex coordinates by initially computing a point P where a chord AB crosses the plane through the polyhedron edge and the center of the sphere. Further, the crease vertex addition component 402 can compute a point in the same direction on the unit sphere and project the result to either one of the facets. Furthermore, the crease vertex addition component 402 can drop the z coordinate to obtain the point on the plane. The insertion of fake crease vertices can provide accurate results during planar processing.

Figure 5:
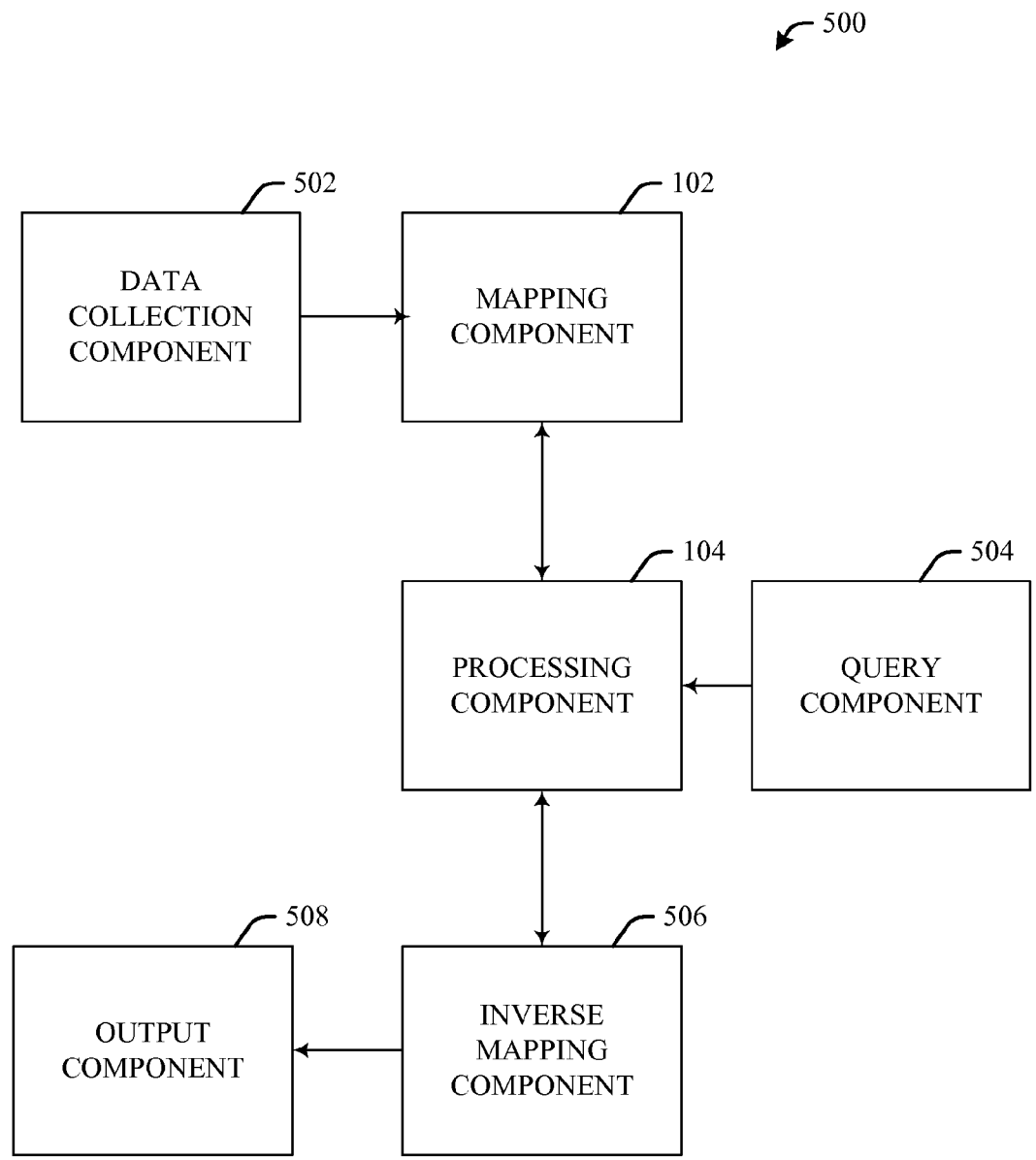
FIG. 5 illustrates a block diagram of an example system that can facilitate processing of round earth data by employing tiled projection in accordance with the disclosed subject matter.

According to another aspect, the node vertex addition component 404 can compute coordinates for a fake node vertex associated with an edge that crosses over two seams. Typically, when the geography is not contained in a hemisphere, the entire globe can be processed as two hemispheres, with a seam object for putting them together. According to one aspect, the local coordinates system for the second hemisphere can be obtained from that of the first one by a 180° rotation about the x axis. This can be achieved by flipping the directions of the y and z axes of the first hemisphere. This can change the relationship between edges and the seam, such that, positive y of a point on the second hemisphere can correspond to negative y on the first one and vice versa, and the orientation of all the second hemisphere's edges can be reversed relative to their first hemisphere counterparts. These differences can be taken into account upon conversion between hemisphere points and seam nodes by the node vertex addition component 404. Node vertices inserted by the node vertex addition component 404 can be tracked when construction results on the two planes are processed along the seam Referring to FIG. 5, depicted is a block diagram of an example system 500 that can facilitate processing of round earth data by employing tiled projection in accordance with the disclosed subject matter. System 500 can include a mapping component 102 and a processing component 104 that each can be substantially similar to respective components and can include such respective functionality as described herein, for example, with regard to system 100.

System 500 can also include a data collection component 502 that can provide the mapping component 102 with geographic data, such as, but not limited to surface data associated with a celestial body (e.g. earth), spheroid, or ellipsoid. As one example, the data collection component 502 can collect round earth data that is stored in a database or can dynamically determine the surface data. It can be appreciated that most any type of database can be employed to store the surface data and the mapping techniques disclosed herein are not database specific.

The mapping component 102 can employ a two-step mapping to project the data from the data collection component 502 onto a single plane for each hemisphere, as described with respect to FIG. 1 and FIG. 3. Further, the processing component 104 can be employed to utilize planar algorithms to perform computations and/or execute queries provided by a query component 504 on the surface data that has been mapped to a common plane by the mapping component 102. As an example, the query component 504 can provide a query, such as, but not limited to, "Do these polygons intersect?" or "Is point q contained in polygon p?" or "Construct new data, such as an intersection of two polygons".

The queries can be a user input via various devices such as a mouse, a roller ball, a keypad, a keyboard, a pen and/or voice activation, for example. Typically, a mechanism such as a push button or the enter key on the keyboard can be employed to facilitate entering the information in order to initiate the search. However, it is to be appreciated that the disclosed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The queries and/or constructions can be executed by the processing component 104 and the results can be provided to an inverse mapping component 506. The inverse mapping component 506 can employ a two-step inverse mapping technique that can map a point from a tile on the common plane to a point on a facet of a polyhedron during the first step and map the point from the facet of polyhedron to the surface of the planet (e.g. earth) or spheroid or ellipsoid. Similar to mapping component 102, the inverse mapping component 506 can preserve polygons and polygonal paths. The inverse mapping component 506 can map the results of the operations performed in the common plane by the processing component 104 to coordinates of the results on the surface of the planet (e.g. earth), spheroid, or ellipsoid. The results can then be displayed by the output component 508. It can be appreciated that the results can be displayed in form of an image, audio, video, text, or a combination thereof. Alternately, the results can be provided as an input for further processing.

As an example, the query component 504 can provide a query to determine the intersection of two paths on the globe. The data collection component 502 can identify the path on the surface of the earth and provide the data to the mapping component 102. Further, the mapping component 102 can map the paths as straight lines or broken straight lines on a common plane based on the number of tiles that contain the projected path. The processing component 104 can employ one or more planar algorithms on the common plane to determine the intersection of the two lines mapped on the plane. The resulting point of intersection is provided to the inverse mapping component 506 that can project the point onto round earth surface. In an aspect, the inverse mapping component 506 projects the point from a tile of the common plane to a facet of the polyhedron and then projects the point from the facet of the polyhedron to the surface of the earth. The result can be displayed to a user by the output component 508. For example, an image of the resulting location on the surface of the earth can be displayed to the user or the coordinates of the resulting location can be provided to the user.

Figure 6:
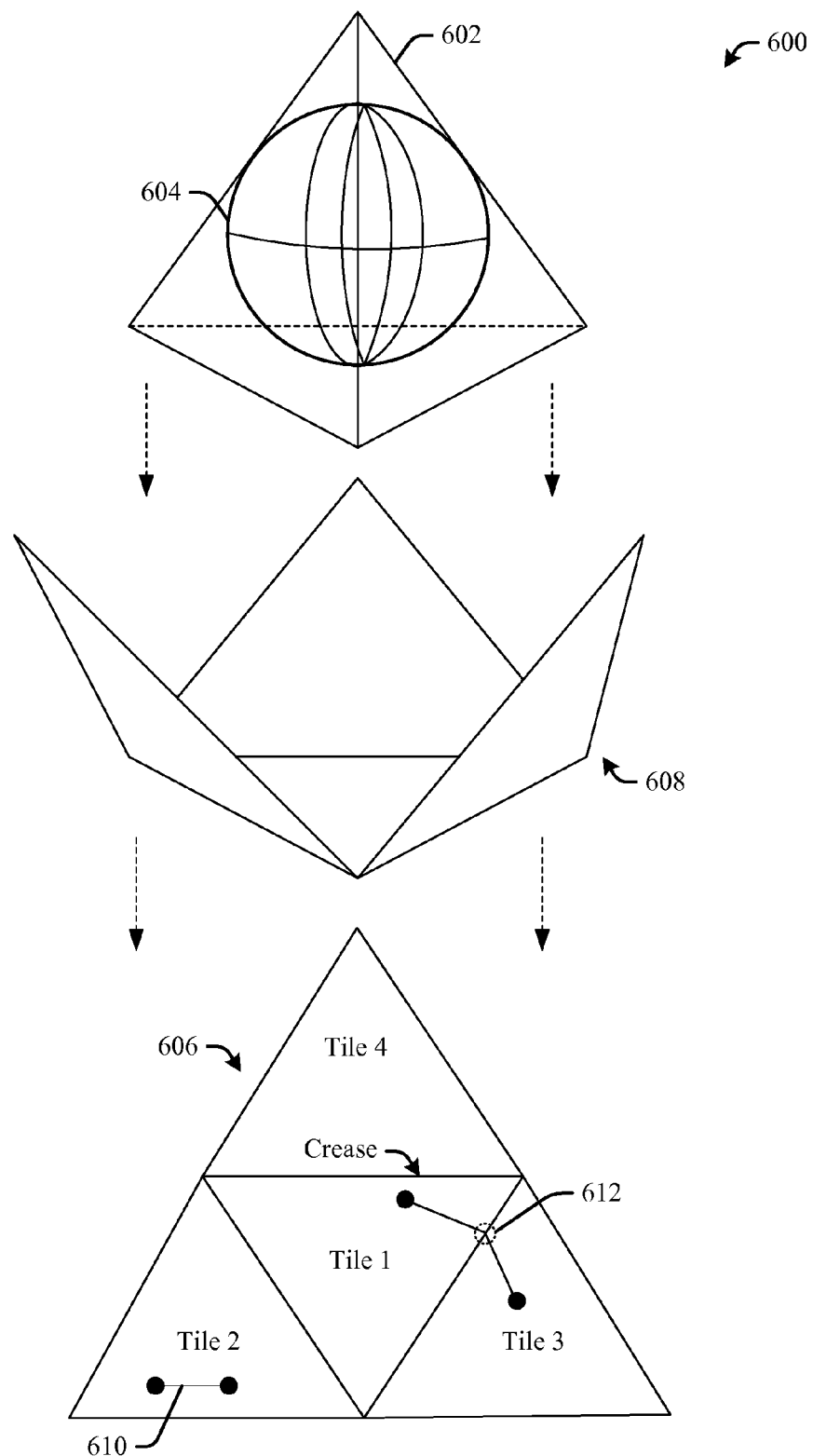
FIG. 6 illustrates an example tetrahedron that can be employed to facilitate mapping of an entire planet onto a single plane, according to an aspect of the subject specification.
Figure 7:
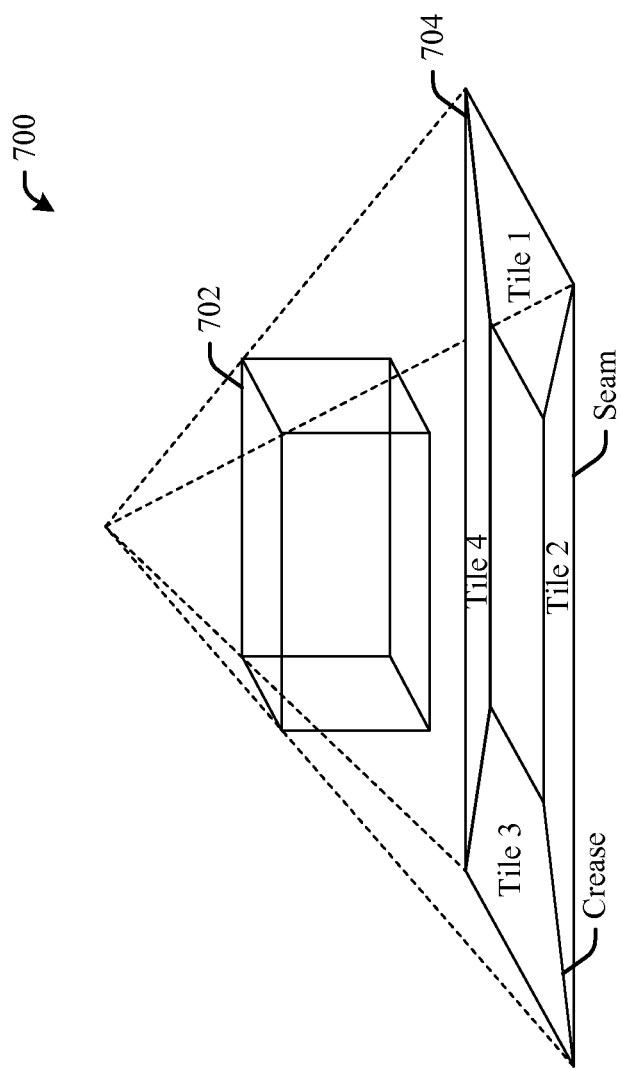
FIG. 7 illustrates an example cube that can be employed to facilitate mapping of a sphere onto a single plane, according to an aspect of the subject specification.

FIG. 6 and FIG. 7 illustrate example embodiments 600 and 700 that depict tiled projections for planar processing of geographic data by employing different platonic solids in accordance with an aspect of the disclosed subject matter. Referring to FIG. 6, there illustrated is a tetrahedron 602 that can be employed to facilitate mapping of an entire planet 604 (or spheroid, ellipsoid, most any celestial body etc.) onto a single plane 606.

Similar to the octahedron 202 described in FIG. 2, a tetrahedron 602 can be employed to facilitate tiled projection. However, the tetrahedron 602 can map both hemispheres of the planet 604 onto a single common plane 606. The mapping can involve two steps, such that, during the first step the surface of the planet 604 can be mapped onto the facets of the tetrahedron 602 and during the second step, the facets of the tetrahedron 602 can be mapped to a common plane 606. As an example, the mapping can be performed by the mapping component 102 (FIG. 1).

In an aspect, one or more points from the surface of the planet 604 can be projected to a corresponding facet of the tetrahedron 602. The tetrahedron 602 can then be unfolded, as shown in 608, such that the facets lie in a common plane 606. According to one aspect, the common plane 606 can be the plane of one of the facets. The tiled mapping employing a tetrahedron can map the entire planet 604 to a triangle in the plane 606. Further, polygons and polygonal paths can be preserved during the mapping, such that, planar algorithms can be accurately applied to the projections in the plane. As an example, the planar processing can be performed by the processing component 104 (FIG. 1).

In one aspect, each facet of the tetrahedron 602 can correspond to a tile (Tile 1-Tile 4) in the plane 606 and the line between two adjacent tiles can be a crease. The image of an edge on the surface of the planet 604 can be projected as a straight line 610 in the plane 606 if the projection is contained in a single tile. However, if the projection crosses between tiles, the image of an edge can be broken into its linear pieces by inserting fake crease vertices 612 at the corresponding creases. Thus, the image of a polygon or a polygonal path can be completely defined by the sequence of original and fake vertices, and the problem can be reduced to the equivalent planar one on the tiled triangle. As an example, the mapping component 102 (FIG. 1) can determine the location of fake crease vertices 612 and insert them accordingly. For construction algorithms, the fake vertices can be ignored when the result is converted back to geodetic coordinates.

Referring now to FIG. 7, there illustrated is half a cube 702 that can be employed to facilitate mapping of a hemisphere (not shown) onto a single plane 704. Similar to the octahedron 202 described in FIG. 2, half a cube 702 can be employed to facilitate tiled projection. As an example, the mapping can be performed by the mapping component 102 (FIG. 1) such that polygons and polygonal paths are preserved in the plane 704. The half cube 702 can circumscribe the sphere (not shown) that is mapped to the plane 704. It can be appreciated, that the disclosed subject matter is not limited to mapping of a sphere and the half cube 702 can facilitate tiled projection of most any celestial body, ellipsoid, spheroid, etc.

Initially, one or more points from the hemisphere (not shown) can be mapped to a facet of the half cube 702. As an example, the facet of the half cube 702 that a particular point from the surface of the hemisphere (not shown) can be mapped onto can be determined by the mapping component 102 (FIG. 1). Further, a central projection can be employed to map the facets of the half cube to a common plane 704, as shown in FIG. 7. The facets of the half cube can be projected to corresponding tiles (Tile 1-Tile 4) in the plane 704.

According to an aspect, a line between two adjacent tiles is a crease and a line between two planes associated with each hemisphere is a seam, as shown in FIG. 7. Typically, straight line segments can be preserved when the projection in the plane 704 are contained in a single tile. However, if the projection crosses between tiles, the projection can be broken into its linear pieces by inserting fake crease vertices at the corresponding creases (e.g. by the mapping component 102 in FIG. 1). Thus, the projection of a polygon or a polygonal path can be preserved in the plane 704. In one aspect, fake vertices can be ignored when the one or more points are mapped back to the spherical surface.

According to an aspect, a sphere (not shown) can be continuously processed in its entirety with two tiled projections, one from each hemisphere. Planar algorithms can be applied to each tiled projection to perform computations, for example, by the processing component 104 (FIG. 1). A polygon and/or polygonal path that straddles the seam between the two planes can be clipped or trimmed by employing a fake node vertex and/or a fake edge along the seam. Geometric constructions can assemble the results of the two planar constructions along the seams.

Figure 8:
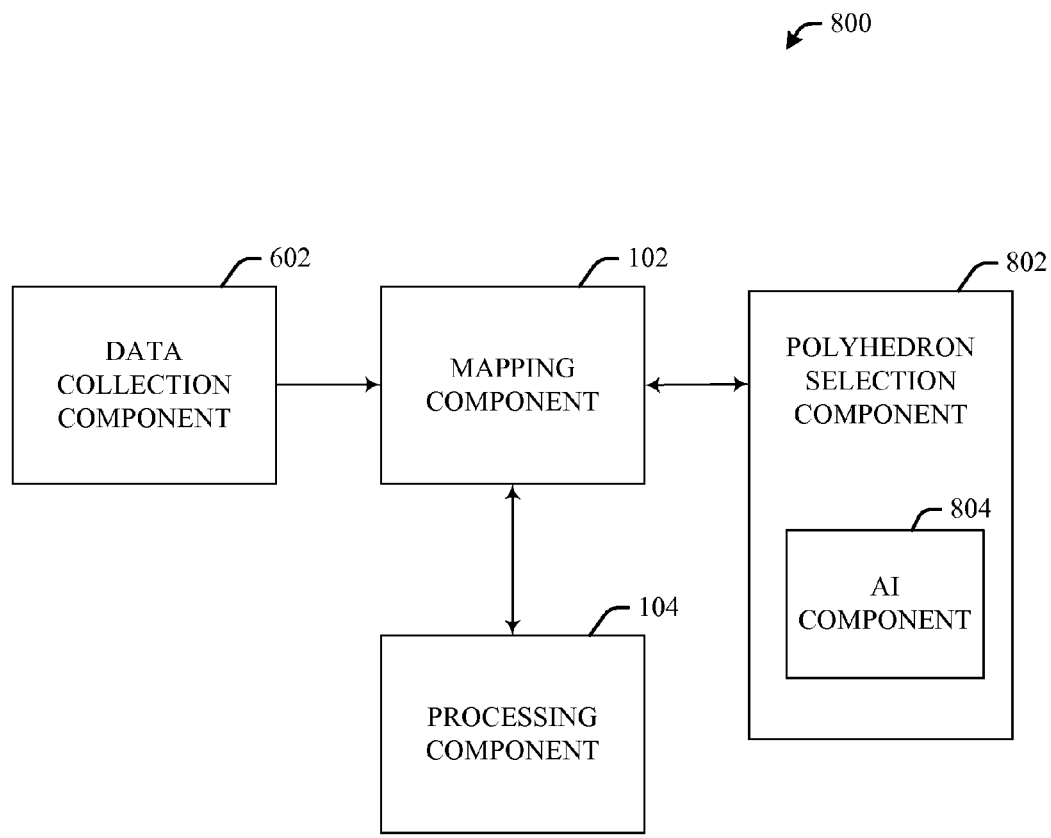
FIG. 8 illustrates an example system that can facilitate tiled projection by mapping surface data associated with an ellipsoid onto a single plane by employing a selected polyhedron in accordance with an aspect of the disclosed subject matter.

FIG. 8 illustrates is an example system 800 that can facilitate tiled projection by mapping surface data associated with an ellipsoid onto a single plane by employing a selected polyhedron in accordance with an aspect of the disclosed subject matter. It can be appreciated that surface data associated with most any ellipsoid, spheroid (e.g. celestial sphere), and/or celestial body (e.g. earth) can be mapped by the system 800.

According to an aspect, system 800 can include a data collection component 502, a mapping component 102 and a processing component 104. The data collection component 502 can provide the mapping component 102 with surface data associated with the ellipsoid that is employed for tiled projection onto a common plane. The processing component 104 can perform operations on the planar data provided by the mapping component 102. The results of the constructions can be provided to a user in geodetic coordinates by an inverse mapping. It is to be appreciated that the data collection component 502, mapping component 102, and processing component 104 can each include their respective functionality, as more fully described herein, for example, with regard to system 100, system 300, and/or system 500.

The mapping component 102 can be associated with a polyhedron selection component 802 that can determine a polyhedron, which can be employed by the mapping component 102 during the tiled projection. According to an embodiment, the polyhedron selection component 802 can receive a user input to select a polyhedron, such as, but not limited to, an octahedron, a tetrahedron or a cube, that can be employed for mapping the surface of the ellipsoid onto a common plane. Based on the polyhedron selected, the mapping component 102 can map surface data associated with the ellipsoid to the facets of the selected polyhedron. Further, the mapping component 102, can project all the facets of selected polyhedron onto a common plane while preserving polygons and polygonal paths, such that, the processing component 104 can employ planar algorithms to perform operations on the data mapped to the common plane.

According to another embodiment, the polyhedron selection component 802 can further include an artificial intelligence (AI) component 804, which facilitates automating one or more features in accordance with the subject innovation. The subject innovation (e.g., in connection with selection of the polyhedron) can employ various AI-based schemes for carrying out various aspects thereof. For example, a process for determining which polygon can be employed by the mapping component 102 can be facilitated via an automatic classifier system and process. Moreover, the classifier can be employed to determine a polygon, such that the surface data can be mapped to a corresponding facet of the determined polygon.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which polygon can be utilized for the tiled projection of surface data onto the common plane. The criteria can include, but is not limited to, the amount of data to be mapped, the number of planes required to map the entire surface of the ellipsoid and/or the type of surface data.

FIGS. 9-13 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
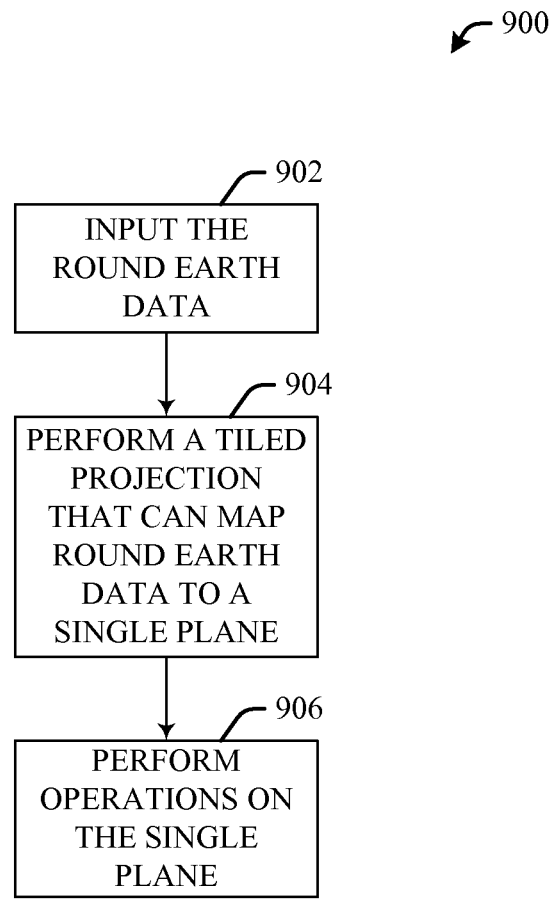
FIG. 9 illustrates an example methodology that can be employed to facilitate tiled projections that map round earth data to a common plane, according to an aspect of the subject specification.

FIG. 9 illustrates an example methodology 900 that can be employed to facilitate tiled projections for mapping round earth data to a common plane, according to an aspect of the subject specification. At 902, round earth data can be received. It can be appreciated that the received data is not limited to round earth data but can include data associated with the surface or most any celestial body (e.g. planet), spheroid or ellipsoid that can be mapped by methodology 900.

At 904, a tiled projection is performed on the received data that maps the received data to a single common plane. In one aspect, the round earth data can first be projected onto the facets of a polyhedron, such as, but not limited to, an octahedron, a tetrahedron or a cube, and then the data from multiple facets of the polyhedron can be projected onto a common plane. As, an example, if an octahedron (or cube) is employed, each hemisphere of the earth can b entirely mapped to a common plane, whereas if a tetrahedron is employed for mapping, the entire globe can be mapped to a single common plane. Irrespective of the polyhedron employed, the mapping preserves polygons and polygonal paths.

At 906, operations can be performed on the data mapped to the common plane. The operations can include, but are not limited to, execution of set queries and/or set constructions. According to an aspect, one or more planar algorithms can be employed to process round earth data mapped onto the common plane.

Figure 10:
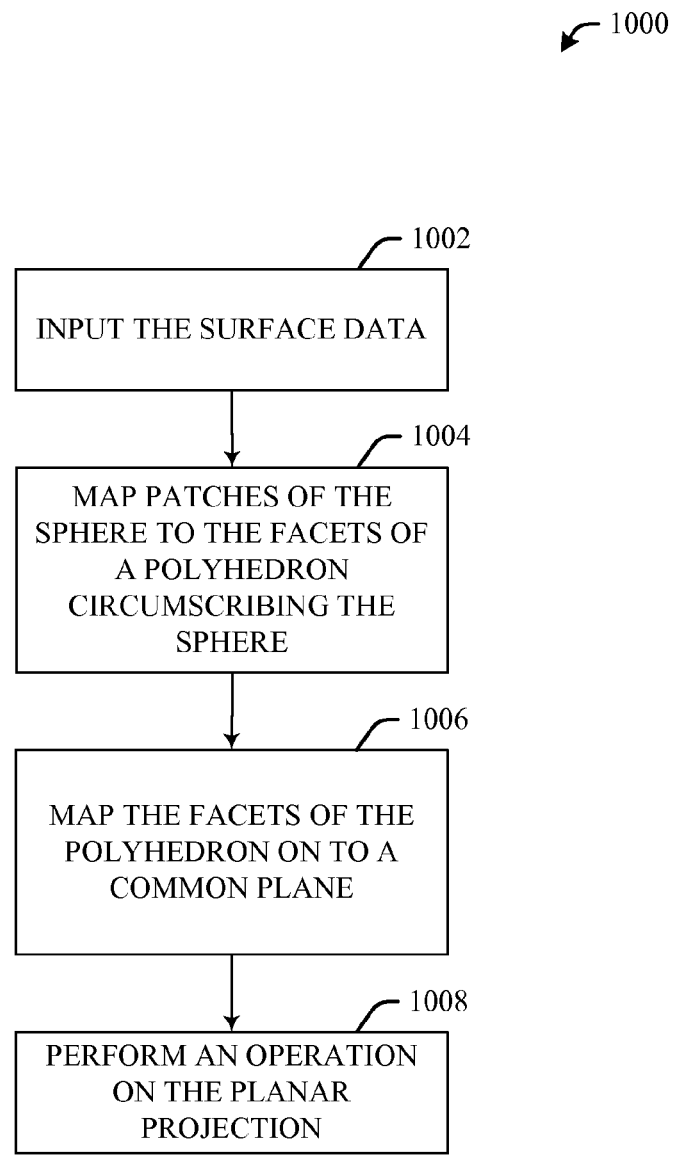
FIG. 10 illustrates an example methodology that can employ a planar algorithm to perform operations on round earth data, according to an aspect of the subject innovation.

Referring now to FIG. 10, there is illustrated an example methodology 1000 that can employ a planar algorithm to perform operations on round earth data, according to an aspect of the subject innovation. At 1002, surface data, such as but not limited to, round earth data can be input. It can be appreciated that celestial data including data associated with the surface of most any celestial body (spheroid or ellipsoid) can be input.

At 1004, patches of the sphere can be mapped to corresponding facets of a polyhedron that circumscribes the sphere. In one aspect, one or more points on the surface of the sphere can be projected to a corresponding facet of a polyhedron based on a gnomonic projection. The facet, to which a point from the surface is mapped, can be determined based on the location of the point. At 1006, multiple facets of the polyhedron are mapped to a single common plane. In one aspect, one or more points on the facets of the polyhedron can be projected to a corresponding tile on the common plane based on an affine or central projection. The combination of the acts 1004 and 1006, map multiple patches from the surface of the earth to a single common plane in a manner such that, polygons and polygonal paths are preserved by introduction of fake vertices.

At 1008, an operation can be performed on the mapped data in the plane. As an example, a planar algorithm can be employed to execute a query and/or construction. The results can then be provided to a user in geodetic coordinates by performing an inverse mapping on the common plane.

Figure 11:
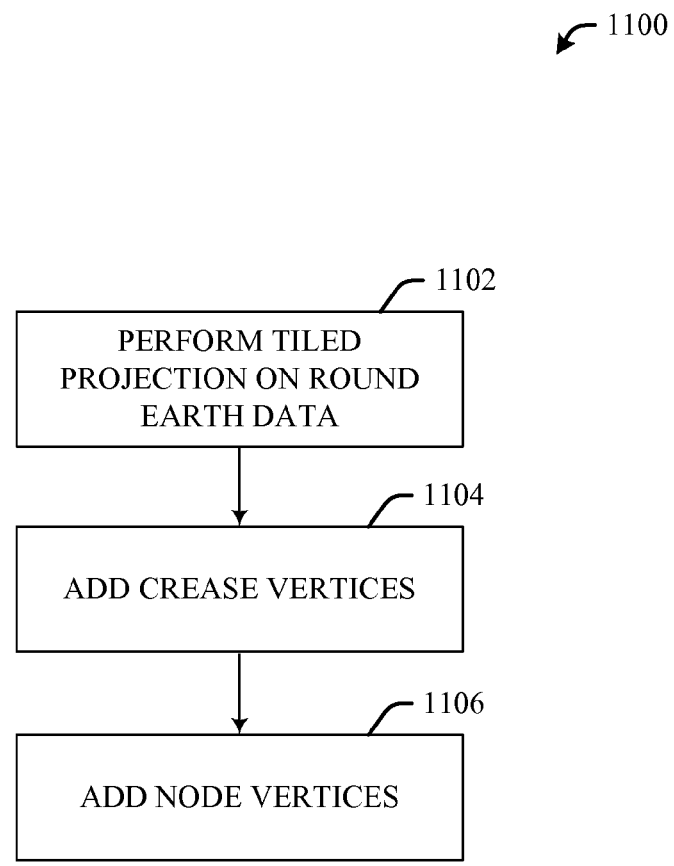
FIG. 11 illustrates an example methodology that can preserve polygons and polygonal paths during tiled projection of surface data onto a single plane, in accordance with an aspect of the subject specification.

FIG. 11 illustrates an example methodology 1100 that can preserve polygons and polygonal paths during tiled projection of surface data onto a single plane, in accordance with an aspect of the subject specification. At 1102, a tiled projection can be performed on round earth data to map the round earth surface to a single common plane. It can be appreciated that surface data of most any celestial body, spheroid (e.g. celestial sphere) or ellipsoid can be employed.

In one aspect, the surface data can be mapped to the common plane in two steps, such that, during the first step, the surface data is mapped to a facet of a polyhedron, such as, but not limited to, an octahedron, tetrahedron or a cube, that circumscribes the round earth, and during the second step the data from the facet of the polyhedron can be mapped to a tile on the common plane. According to one aspect, straight line segments can be preserved when the projection is contained in a single tile on the plane. At 1104, fake crease vertices can be inserted at the corresponding creases if the projection crosses between tiles. Thus, the projection in the plane can be broken into its linear pieces by inserting fake crease vertices, such that, the projection of a polygon or a polygonal path in the plane is preserved.

At 1106, a fake node vertex can be inserted at a corresponding seam if the projection crosses a seam. According to an aspect, when the geography is not contained in a hemisphere, the entire globe can be processed as two hemispheres, with a seam object for putting them together (e.g., when an octahedron or a cube is employed for the tiled projection). Node vertices can be tracked when construction results on the two planes are processed along the seam.

Figure 12:
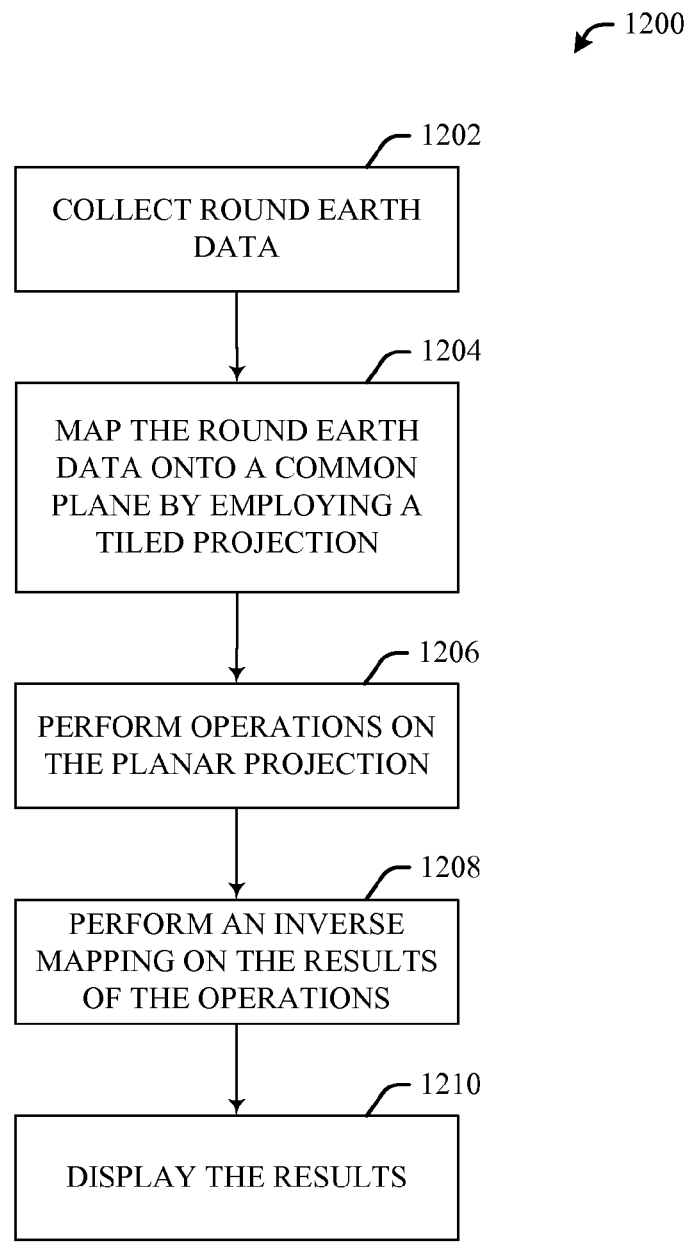
FIG. 12 illustrates an example methodology that can facilitate processing of round earth data by employing tiled projection in accordance with the disclosed subject matter.

Referring now to FIG. 12, there illustrated is an example methodology 1200 that can facilitate processing of round earth data by employing tiled projection in accordance with the disclosed subject matter. At 1202, round earth data (or surface data of a celestial body, a planet, spheroid or ellipsoid) can be collected. The data can be dynamically determined or obtained from a data store.

At 1204, the round earth data can be mapped to a common plane by employing tiled projections. At 1206, one or more operations can be performed on the planar projection by employing planar algorithms. As an example, the operations can include a query and/or construction that can be provided by a user. At 1208, a two-step inverse mapping technique can be performed on the results of the construction that can map a point from a tile on the common plane to a point on a facet of a polyhedron during the first step and map the point from the facet of polyhedron to the round earth surface. According to an aspect, the inverse mapping can preserve polygons and polygonal paths and provide accurate results. At 1210, the results can then be displayed. As an example, the results can be displayed in form of an image, audio, video, text, or a combination thereof. Alternately or in addition, the results can be provided as an input for further processing.

Figure 13:
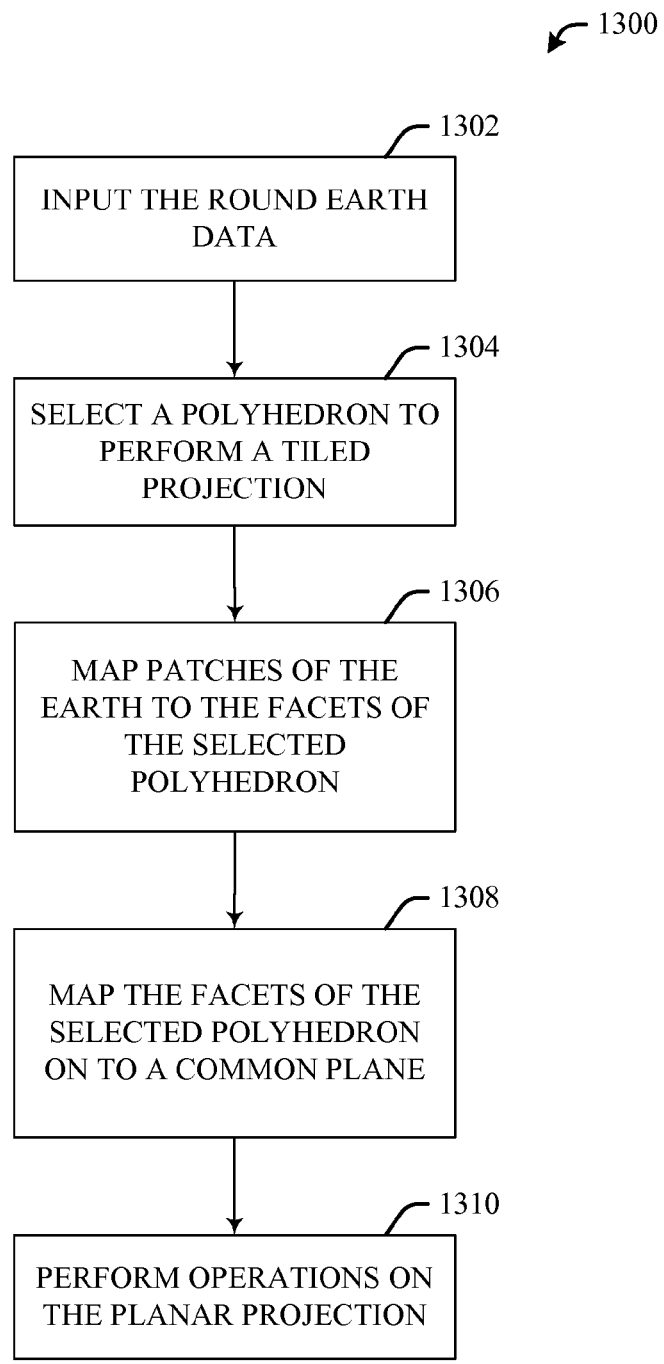
FIG. 13 illustrates an example methodology that can perform tiled projection by employing a selected polyhedron in accordance with an aspect of the disclosed subject matter.

FIG. 13 illustrates an example methodology 1300 that can perform tiled projection by employing a selected polyhedron in accordance with an aspect of the disclosed subject matter. At 1302, round earth data can be input. It can be appreciated that surface data associated with most any ellipsoid, spheroid, and/or celestial body can be input and mapped by employing methodology 1300.

At 1304, a polyhedron that can be employed during the tiled projection can be selected. According to one aspect, a polyhedron such as, but not limited to, an octahedron, a tetrahedron or a cube can be selected and can be employed for mapping the surface of the ellipsoid onto a common plane. As an example, the selection can be based on a user input or can be dynamically determined based on an artificial intelligence scheme. At 1306, patches from the earth's surface can be mapped to corresponding facets of the selected polyhedron. At 1308, the facets of the selected polyhedron can be mapped to corresponding tiles on a single common plane. According to an aspect, the mapping preserves polygons and polygonal paths by introducing fake vertices. At 1310, operations can be performed on the planar projection by employing planar algorithms.

Figure 14:
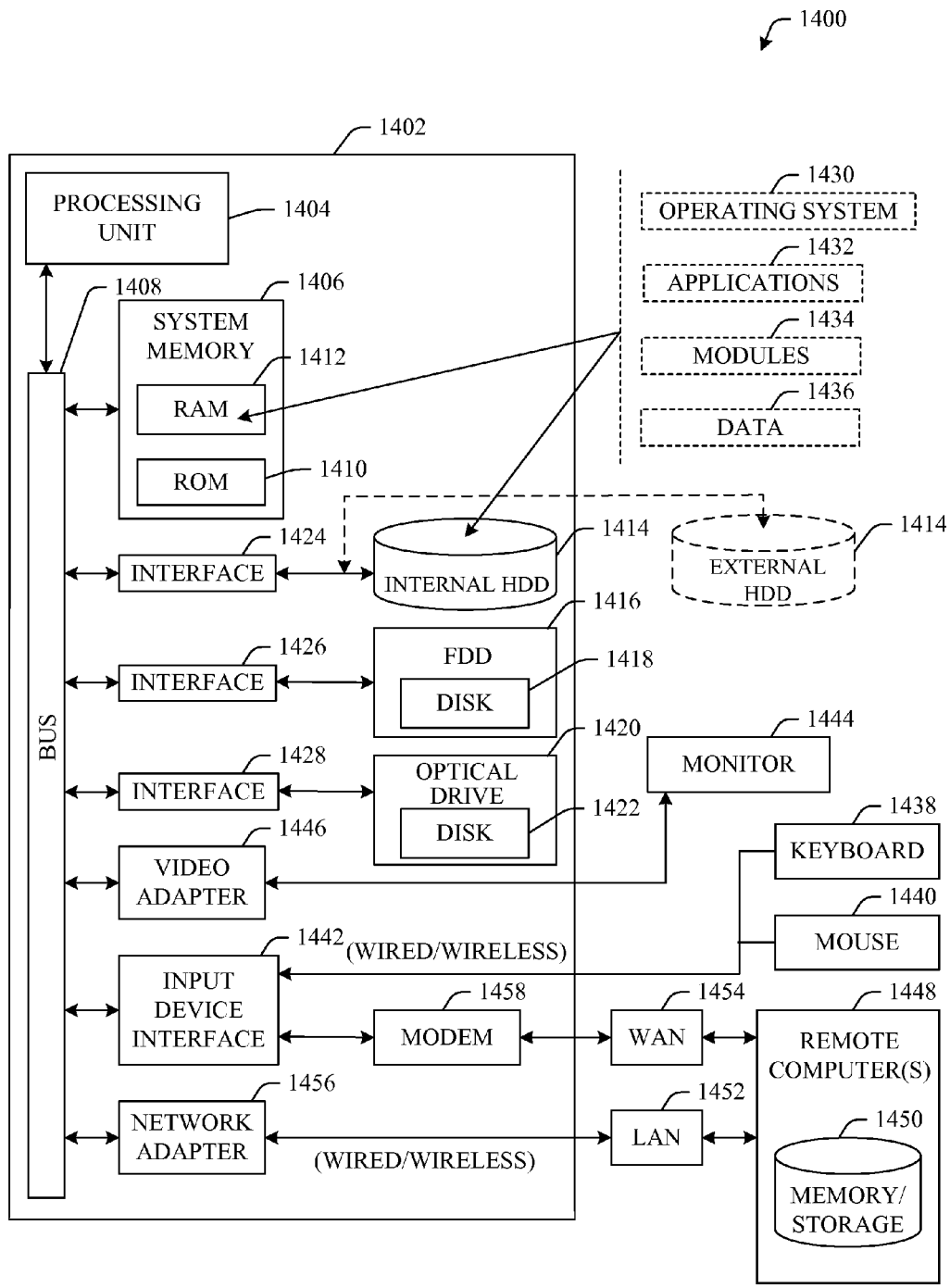
FIG. 14 illustrates a block diagram of a computer operable to execute the disclosed architecture that facilitates planar processing of round earth data by employing tiled projection.

Referring now to FIG. 14, there is illustrated a block diagram of a computer operable to execute the disclosed architecture that facilitates planar processing of round earth data by employing tiled projection. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1594 interface technologies. Other external drive connection technologies are within contemplation of the subject specification.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1594 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
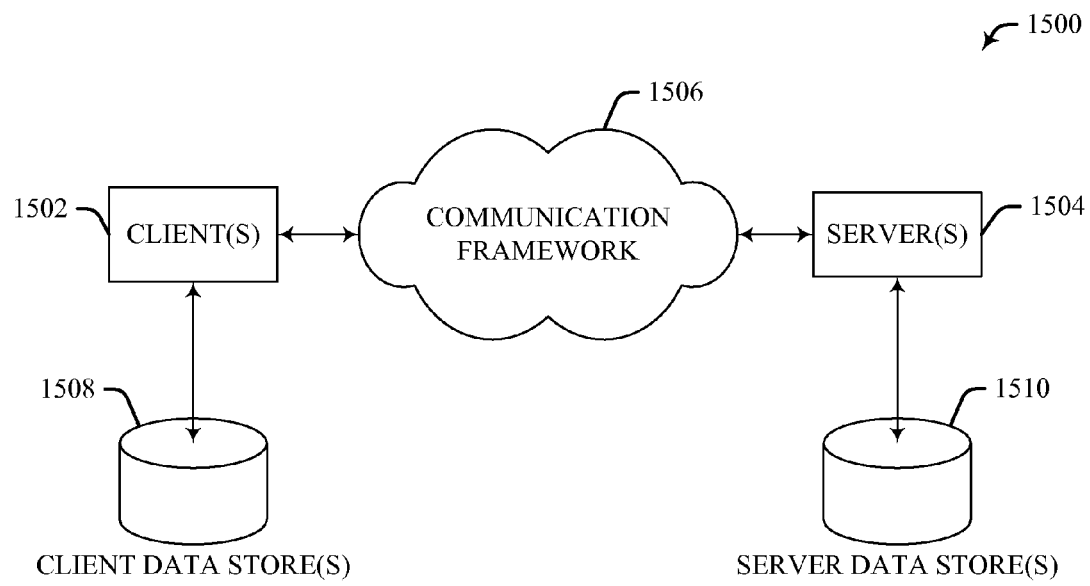
FIG. 15 illustrates a schematic block diagram of an exemplary computing environment that facilitates tiled projections for planar processing of round earth data in accordance with the subject specification.

Referring now to FIG. 15, there is illustrated a schematic block diagram of a computing environment 1500 that facilitates tiled projections for planar processing of round earth data in accordance with the subject specification. The system 1500 includes one or more client(s) 1502. The client(s) 1502 can be hardware and/or software (e.g., threads, processes, computing devices). The client(s) 1502 can house cookie(s) and/or associated contextual information by employing the specification, for example.

The system 1500 also includes one or more server(s) 1504. The server(s) 1504 can also be hardware and/or software (e.g., threads, processes, computing devices). The servers 1504 can house threads to perform transformations by employing the specification, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system configured to facilitate tiled projections for planar processing of spherical data, the computer implemented system comprising:
   a processor;
   a mapping component configured to project the spherical data, mapped onto facets of a polyhedron, to a single plane while preserving at least one of polygons or polygonal paths via insertion of at least one fake crease vertex;
   a processing component configured to employ a planar algorithm to compute query results from data mapped to the single plane, wherein the processing component is further configured to display a planar processing result of the planar algorithm on a sphere corresponding to the spherical data; and
   a computer-readable storage medium storing instructions that, when executed by the processor, cause the processor to implement at least one of the mapping component or the processing component.

2. The computer implemented system of claim 1, wherein the polyhedron is at least one of an octahedron, a tetrahedron or a cube, the polyhedron providing circumscription of a sphere associated with the spherical data.

3. The computer implemented system of claim 1, wherein the mapping component is configured to project at least one of an entire hemisphere or an entire sphere onto the single plane based in part on the polyhedron employed for the mapping, such that polygons and polygonal paths are preserved during the mapping.

4. The computer implemented system of claim 1, further comprising a first projection component configured to map one or more points on a sphere to one or more points on corresponding facets of the polyhedron by employing a gnomonic projection.

5. The computer implemented system of claim 4, further comprising a second projection component configured to map the one or more points on the corresponding facets to one or more points on corresponding tiles of the single plane by employing a central projection.

6. The computer implemented system of claim 1, further comprising a crease vertex addition component configured to insert the fake crease vertex on a projection in the single plane at a crease that separates the projection onto two tiles.

7. The computer implemented system of claim 1, further comprising a node vertex addition component configured to insert a fake node vertex on a projection in the single plane at a seam that separates the projection onto two planes.

8. The computer implemented system of claim 1, further comprising, an inverse mapping component configured to perform a polygon-preserving inverse mapping to map a result of the computation from the single plane to spherical coordinates.

9. The computer implemented system of claim 1, further comprising a polyhedron selection component configured to determine a type of polyhedron employed for the mapping based in part on at least one of a user input or an artificial intelligence(AI)-based scheme.

10. A computer implemented method that facilitates mapping of data from a surface of a sphere to a common plane, the computer implemented method comprising:
   executing by a processor, instructions that, when executed, cause operations to be performed comprising:

generating a projection by projecting data mapped to facets of a polyhedron onto the common plane;
preserving a polygon of the polyhedron on the projection via insertion of a fake crease vertex;
performing at least one query operation on the projection by employing a planar algorithm, the at least one query operation comprising computing query results from data projected onto the common plane; and
projecting a planar processing result of the planar algorithm onto the surface of the sphere.

11. The computer implemented method of claim 10, wherein the polyhedron is at least one of an octahedron, a tetrahedron or a cube that circumscribes the sphere.

12. The computer implemented method of claim 10, further comprising inserting the at least one fake crease vertex on the projection at a crease that separates the projection onto two tiles in the common plane.

13. The computer implemented method of claim 10, further comprising employing a gnomonic projection to map at least one point from the surface of the sphere to at least one point on one or more corresponding facets of the polyhedron.

14. The computer implemented method of claim 13, further comprising employing a central projection to map the at least one point on the one or more corresponding facets to at least one point on one or more corresponding tiles in the common plane.

15. The computer implemented method of claim 10, further comprising projecting at least one of an entire hemisphere or the entire sphere onto a single plane based in part on the polyhedron employed for mapping.

16. A computer-readable storage medium having computer executable instructions that, when executed by a processor, cause operations to be performed, comprising:
generating a projection by projecting spherical data mapped to facets of a polyhedron onto a common plane;
preserving a polygon of the polyhedron on the projection via insertion of a fake crease vertex;
processing data projected onto the common plane by employing a planar algorithm to perform at least one query operation, the at least one query operation comprising computing query results from the projection; and
projecting a planar processing result of the planar algorithm onto a sphere corresponding to the spherical data.

17. The computer readable storage medium of claim 16, wherein the polyhedron is at least one of an octahedron, a tetrahedron or a cube that circumscribes a sphere.

18. The computer readable storage medium of claim 16, wherein the projection onto the common plane is at least one of an affine projection or a central projection.

19. The computer readable storage medium of claim 16, further comprising, mapping an arc on a sphere as a straight line in the common plane, when a projection of the arc on the common plane is contained in one tile.

20. The computer readable storage medium of claim 16, further comprising, mapping an arc on the sphere as a broken straight line by inserting the at least one fake crease vertex, when a projection of the arc on the common plane is contained in two or more tiles.

* * * * *